United States Patent [19]

Feddersen et al.

[11] Patent Number: 5,047,271

[45] Date of Patent: * Sep. 10, 1991

[54] APPARATUS AND PROCESS RELATING TO A PREFORM AND A CONTAINER WITH GEODESIC REINFORCEMENT

[75] Inventors: Frederick J. Feddersen, Londonderry; Jizu J. Cheng, Manchester, both of N.H.

[73] Assignee: FMT Holdings, Inc., Londonderry, N.H.

[ * ] Notice: The portion of the term of this patent subsequent to Jan. 1, 2008 has been disclaimed.

[21] Appl. No.: 541,719

[22] Filed: Jun. 21, 1990

[51] Int. Cl.$^5$ .................. B65D 1/02; B65D 23/00
[52] U.S. Cl. .................. 428/36.92; 215/1 C; 220/608; 428/542.8
[58] Field of Search .......... 428/36.92, 542.8; 215/1 C; 220/608

[56] References Cited

U.S. PATENT DOCUMENTS

| 3,598,270 | 8/1971 | Adomaitis | 215/1 C |
|---|---|---|---|
| 3,757,978 | 9/1973 | Gilbert | 215/1 C |
| 3,811,588 | 5/1974 | Vermeerbergen et al. | 215/1 C |
| 3,871,541 | 3/1975 | Adomaitis | 215/1 C |
| 4,024,975 | 5/1977 | Uhlig | 215/1 C |
| 4,108,324 | 8/1978 | Krishnakumar et al. | 215/1 C |
| 4,134,510 | 1/1979 | Chang | 215/1 C |
| 4,249,667 | 2/1981 | Pocock et al. | 215/1 C |
| 4,261,948 | 4/1981 | Krishnakumar et al. | 264/532 |
| 4,267,144 | 5/1981 | Collette et al. | 215/1 C |
| 4,334,627 | 6/1982 | Krishnakumar et al. | 215/1 C |
| 4,335,821 | 6/1982 | Collette et al. | 215/1 C |
| 4,403,706 | 9/1983 | Mahajan | 428/592.8 |
| 4,436,216 | 3/1984 | Chang | 215/1 C |
| 4,442,944 | 4/1984 | Yoshino et al. | 215/1 C |
| 4,525,401 | 6/1985 | Pocock et al. | 215/1 C |
| 4,598,831 | 7/1986 | Nakamura et al. | 215/1 C |
| 4,785,948 | 11/1988 | Strassheimer | 428/36.92 |
| 4,981,736 | 1/1991 | Feddersen et al. | 428/36.92 |

FOREIGN PATENT DOCUMENTS 62-235041 10/1987 Japan .

Primary Examiner—James J. Seidleck
Attorney, Agent, or Firm—Davis, Bujold & Streck

[57] ABSTRACT

A preform (10) for producing a plastic preform for forming blow molded plastic containers which comprises: a neck portion (16) defining an opening; a tubular sidewall portion (24) depending therefrom; and an integral base structure (28) depending from the tubular sidewall portion to a closed end (32); the preform having an outside wall face and an inside wall face with one of these, in the base structure, having integrally formed thereon a plurality of filets (36), extending longitudinally of the preform and defining a reinforcement (38) of varying thickness spaced from the closed end and circumscribing the base structure, wherein the filets decrease progressively in width and radial thickness at least from the reinforcing ring toward the closed end. The preform is capable of forming a blow molded plastic container with a bottom portion (130) having a reinforcement of circumferentially continuous radially extending alterations in wall thickness with a regularly undulating cross-section along the circumference. Preferably the filets are integral with the inside wall face. The invention also covers a mold-core rod combination for making such a preform, a process of using such a preform to make plastic containers by stretch/blow molding and containers including containers when produced from said preforms or combinations, or by said process.

13 Claims, 16 Drawing Sheets

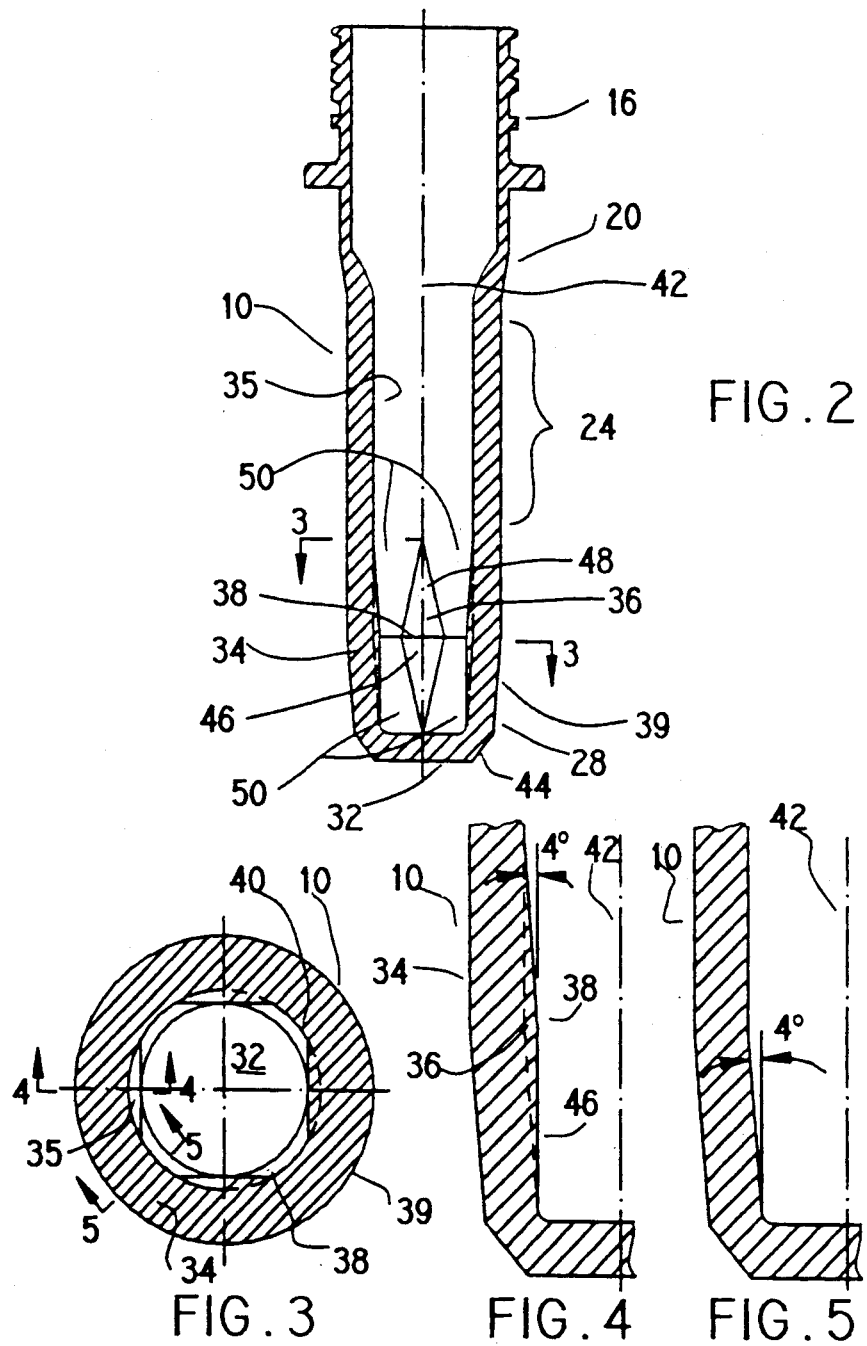

APPARATUS AND PROCESS RELATING TO A PREFORM AND A CONTAINER WITH GEODESIC REINFORCEMENT

This invention relates to a preform having geodesic reinforcement for use in blow molding, self-standing, polyester containers suitable for containing carbonated beverages, such containers and an apparatus and process relating thereto.

Blow molded plastic bottles have largely replaced the heavier glass bottles previously used for soft drinks, and the like. In a bottle of plastic, the weight of the bottle itself is negligible as opposed to the weight of a glass bottle of similar capacity. The first plastic bottles were generally two piece bottles. The bottle comprises the pressure vessel portion and a base which permits the bottle to stand upright. The pressure vessel portion is typically of a tough, flexible plastic such as polyethylene terephthalate (PET) and has very thin sidewalls which become resiliently rigid for gripping due to the internal pressure created by the carbon dioxide gas in the soft drink liquid contained therein. The bottom is semispherical for the same pressure-containing reasons and, therefore, the separate base is required in order to have the bottle be able to stand by itself. The base is typically of a plastic such as polyethylene and is attached over the bottom of the pressure vessel portion with adhesive. Presently, approximately 75% of the beverage containers produced worldwide are of the abovedescribed two-piece construction.

An obvious approach to a plastic bottle intended for the holding of carbonated beverages was one having a so-called "champagne" base or bottom having a peripheral chime upon which the bottle sits surrounding an inward sloping portion which resists the internal pressure. The only problem with this approach using a unitary thickness plastic is that the bottom has a tendency to invert from the internal pressure. In an attempt to avoid that problem, numerous bottle configurations have been proposed incorporating integral pressure-resistant ribs and/or ring reinforcements into the bottom of the bottle. One such arrangement is the design disclosed in U.S. Pat. No. 4,785,948 (Strassheimer). This patent discloses a preform for forming blow molded plastic containers having circumferentially spaced, radially extending, continuous alterations in wall thickness provided by thickened portions, in the interior of the base of the preform, which extend toward the closed end of the bottom in the form of a plurality of flat faces extending axially of the preform and parallel to that axis whereby the cross-section of the preform in this base portion extending from a sidewall forming portion to the closed end will have a substantially constant cross-section, preferably with a hexagonal interior wall and a circular exterior wall. While this design may provide some savings in material usage by comparison with preforms having an annular thickened region circumscribing the preform for forming the base region of a container, the constant cross-section arrangement of this patent does not maximize the material savings possible as the thickened area of constant cross-section when blown to form the base of the container will result in thickened areas not only in the chime region where these are required, but also in locations radially removed from the chime region where the strength required from thickening is not required.

It is an object of the present invention to provide a preform, together with a core rod-mold combination and process for producing such a preform, for use in the blow molding of one-piece, self-standing plastic bottles for containing carbonated beverages which have bases of the champagne type capable of resisting inversion from internal forces while utilizing less material than current production designs by the utilization of the principles of triangulation exemplified in geodesic designs, and a container when made therefrom or thereby.

It is also an object of the present invention to provide a self-standing container for containing carbonated beverages with a base of the champagne type capable of resisting inversion from internal forces while utilizing less material than current production designs by the utilization of the principles of triangulation exemplified in geodesic designs.

According to a first aspect of the invention there is provided a plastic preform for forming blow molded plastic bottles which comprises: a neck portion defining an opening; a tubular sidewall portion depending therefrom; and an integral base structure depending from the tubular sidewall portion to a closed end; said preform having an outside wall face and an inside wall face, with at least one of the inside wall face and the outside wall face of the base structure having integrally formed thereon a plurality of filets, extending longitudinally of the preform to define a reinforcement of varying thickness spaced from the closed end and circumscribing the base structure, wherein said filets decrease progressively in width and radial thickness at least from said reinforcing ring toward said closed end, the preform being capable of forming a blow molded plastic container with a bottom portion having a reinforcement of circumferential alterations in wall thickness with a regularly undulating cross-section along said circumference.

According to a second aspect of the invention there is provided a mold-core rod combination for forming an injection molded preform for producing blow molded plastic containers which comprises: a female preform mold having an interior surface and a core rod having an exterior surface together defining a mold cavity having the shape of the preform, said preform having a neck portion defining an opening; a tubular sidewall portion depending therefrom; and an integral base structure depending from the tubular sidewall portion to a closed end; said preform having an outside wall face and an inside wall face, with at least one of the inside wall face and the outside wall face of the base structure having integrally formed thereon a plurality of filets, extending longitudinally of the preform to define a reinforcement of varying thickness spaced from the closed end and circumscribing the base structure, wherein said filets decrease progressively in width and radial thickness at least from said reinforcing ring toward said closed end, the preform being capable of forming a blow molded plastic container with a bottom portion having a reinforcement of circumferential alterations in wall thickness with a regularly undulating cross-section along said circumference.

According to a third aspect of the present invention, there is provided a process for manufacturing a molecularly oriented plastic bottle comprising the steps of (1) providing an injection molded plastic preform having a neck portion defining an opening; a tubular sidewall portion depending therefrom; and an integral base structure depending from the tubular sidewall portion to a closed end; said preform having an outside wall face and an inside wall face, with at least one of the inside wall face and the outside wall face of the base structure having integrally formed thereon a plurality of filets, extending longitudinally of the preform to define a reinforcement of varying thickness spaced from the closed end and circumscribing the base structure, wherein said filets decrease progressively in width and radial thickness at least from said reinforcing ring toward said closed end, the preform being capable of forming a blow molded plastic container with a bottom portion having a reinforcement of circumferential alterations in wall thickness with a regularly undulating cross-section along said circumference; (2) positioning said preform in a stretch/blow mold; and (3) stretch/blowing said preform in said blow mold to form a finished container.

According to a forth aspect of the present invention, there is provided a plastic container which comprises: a top portion defining an opening; a tubular sidewall portion depending therefrom; and an integral base structure depending from the tubular sidewall portion to a closed end disposed centrally of the base structure; said container having an outside wall face and an inside wall face, with at least one of the inside wall face and the outside wall face of the base structure having integrally formed thereon a plurality of filets, defining a circumferential reinforcement of regularly undulating thickness spaced from the closed end and circumscribing the base structure, wherein said filets decrease progressively in width and thickness at least from said reinforcing ring toward said closed end.

The invention will now be described, by way of example, with reference to the accompanying drawings, in which:

FIG. 2 is a cross-sectional elevation of the entire preform illustrated in part, in FIG. 1;

FIG. 3 is a staggered cross-section on section line 3—3 of FIG. 2;

FIG. 4 is a fragmentary cross-section on section line 4—4 of FIG. 3;

FIG. 5 is a fragmentary cross-section on section line 5—5 of FIG. 3;

Figure 1:
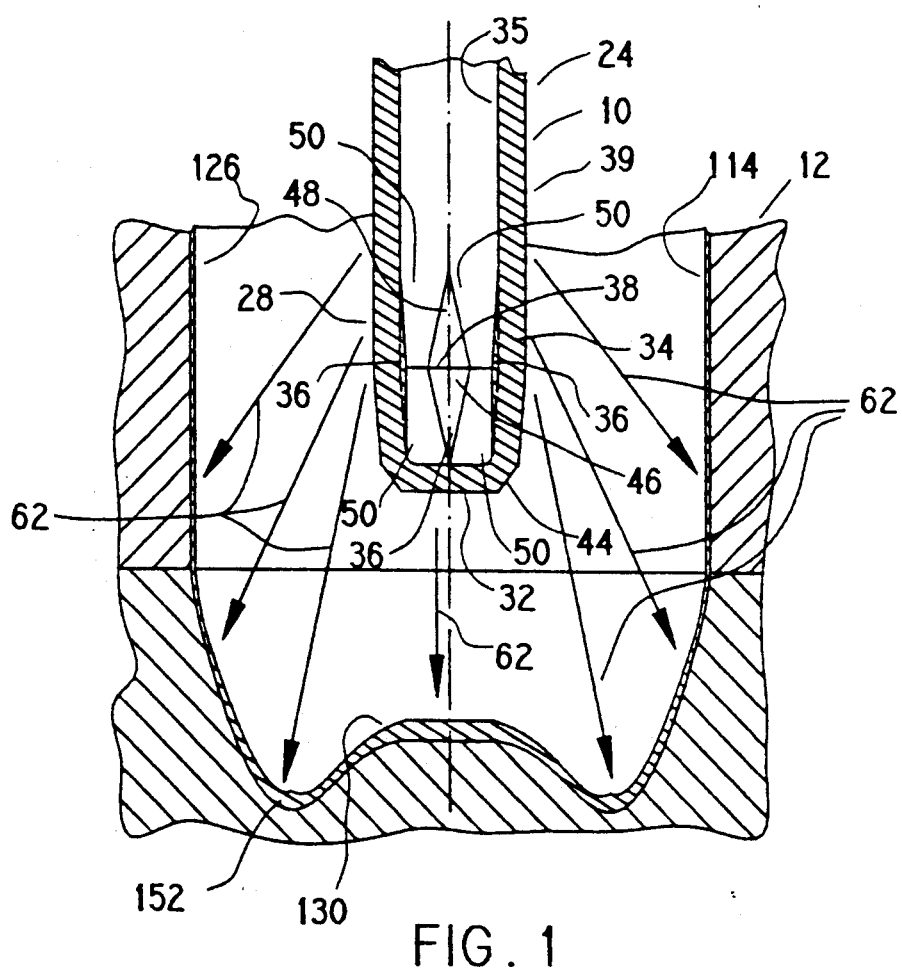
FIG. 1 is a cross-section of the base portion of a preform in accordance with the first embodiment of the present invention shown in an associated portion of a blow mold.
Figure 6:
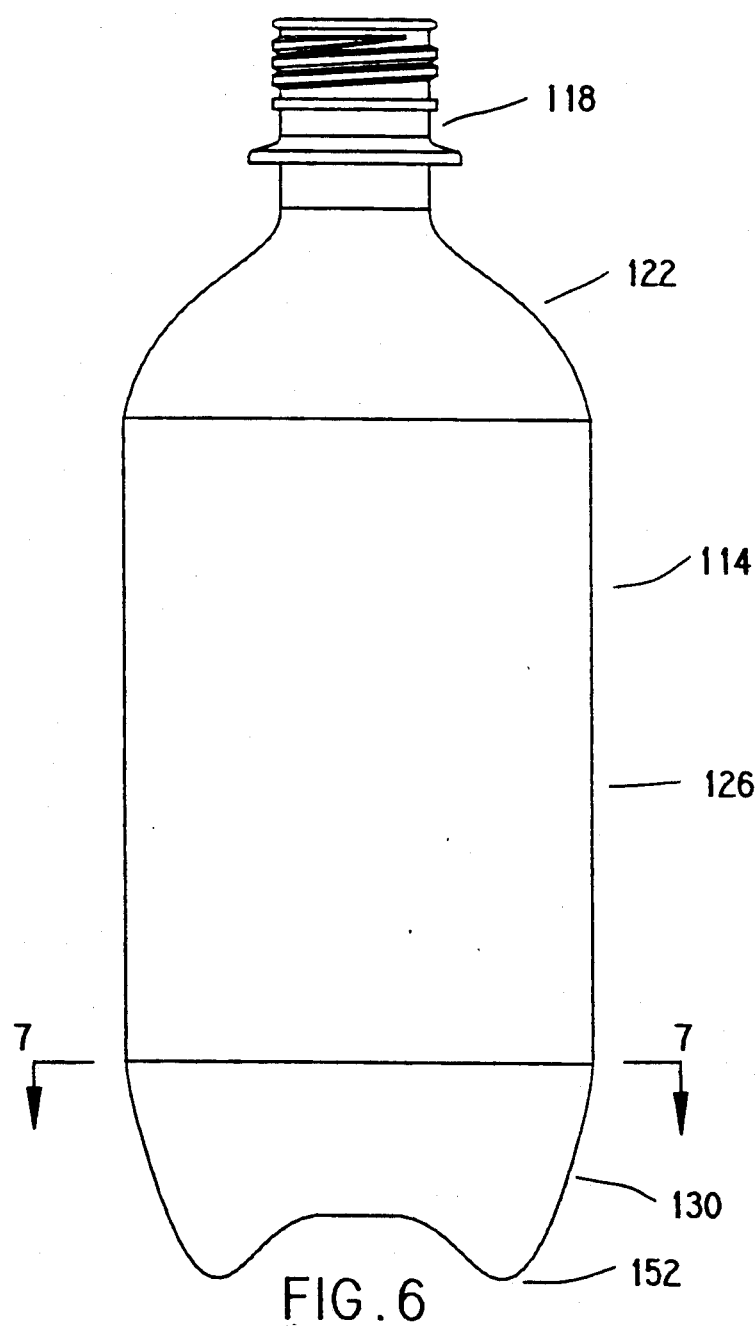
FIG. 6 is an exterior elevation of a bottle when made from a preform in accordance with the first embodiment in a blow mold as partially illustrated in FIG. 1.
Figure 7:
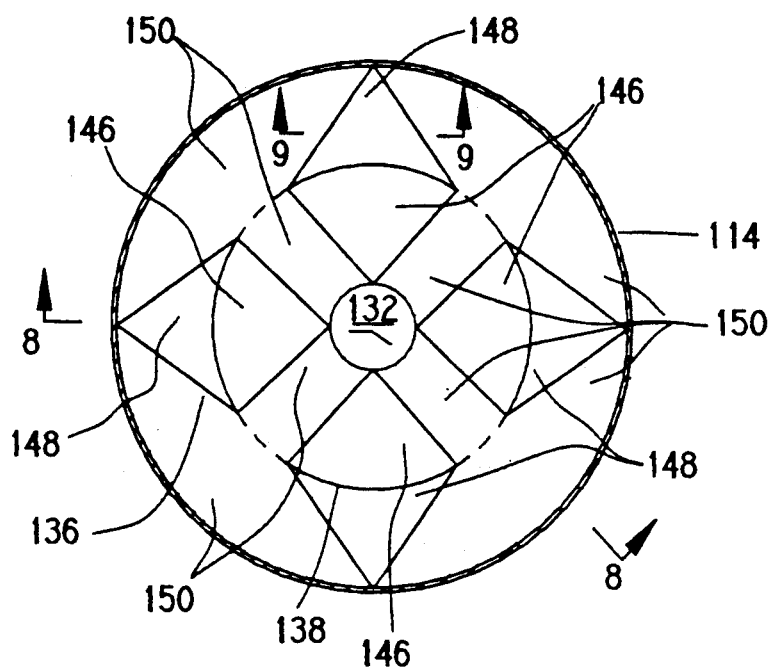
FIG. 7 is a sectional plan view on section line 7—7 of FIG. 6.
Figure 8:
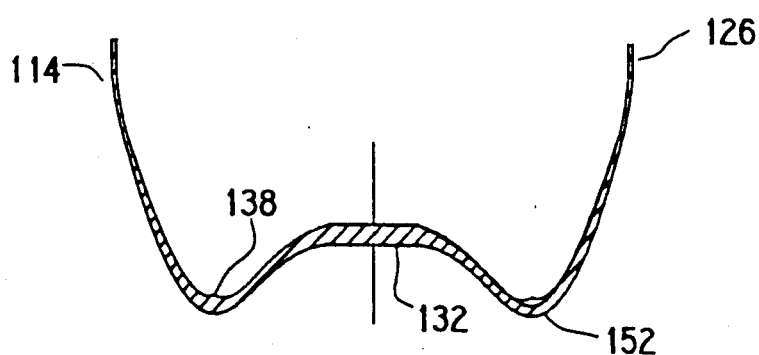
FIG. 8 is a staggered sectional elevation on section line 8—8 of FIG. 7.

The present invention is directed, in part, to a preform for a free-standing, one piece plastic bottle, preferably of PET (polyethylene terephthalate), for carbonated beverages having a champagne bottle type shaped base of controlled thickness to provide an annular chime to provide stable upright standing ability wherein the thickness of the bottom is controlled to provide adequate resistance to internal pressure, that thickness being derived from a varying thickness in the preform. More particularly, the base of the present invention incorporates an integral geodesic structure that runs horizontally of the bottle in the hoop direction. The reinforcing structure is placed in a location within the base of the bottle that has a moment arm trying to invert the base and provides sufficient strength to withstand that moment arm and keep the push up of the bottom intact. A feature is that the shape of the preform's interior and exterior walls are ever decreasing in diameter from the neck to the base so that it may be easily removed from a suitable core and injection mold cavity thereby avoiding the need for a split mold.

Referring first to FIGS. 1 through 10, a first embodiment of the present invention consists of a preform 10 injection molded from PET for blow molding, in a blow mold 12, to produce a bottle 114 of a self-standing champagne bottle type base suitable for carbonated beverages and having a half-litre capacity with a weight of 27.5 grams. The preform consists of a neck portion 16 from which the neck 118 of the bottle is produced, a shoulder portion 20 from which the shoulder 122 of the bottle is blown, a sidewall portion 24 of substantially constant thickness from which the sidewall 126 of the bottle is blown and a base structure 28 terminating in a closed end 32 from which the base 130 of the bottle is blown. The neck portion 16 is connected to the sidewall portion 24 by way of the shoulder portion 20 which forms a transition between the neck portion (which remains substantially unchanged during the blow molding process) and the sidewall portion which, after temperature conditioning, is stretched longitudinally in the blow mold before the blowing operation takes place in most cases. In the shoulder portion 20, the thickness of the material increases progressively from the neck portion to the sidewall portion, which is of a substantially constant thickness and diameter. The sidewall portion 24 terminates remote from the shoulder portion 20 at a transition to the base structure which itself terminates in the closed end 32, from which the center of the base of the bottle is produced. The base structure between the sidewall portion and the closed end consists of an annular wall portion 34 on the interior wall face 35 of which are integrally formed a plurality of longitudinally extending reinforcing filets 36, four in number in this embodiment, symmetrically disposed around the interior wall face 35 of wall portion 34 spaced from one another to form an intermittent geodesic reinforcement ring 38 defined on its outside by the circular wall face 35 of the wall portion 34 and on its interior by a substantially octagonal line 40 symmetrically disposed about and normal to the axis 42 of the preform. Apart from the filets 36, the preform is of a circular cross-section, normal to axis 42, having interior and exterior surfaces which are of ever decreasing diameter from the neck to the base. This ever decreasing diameter needs only to be sufficient to facilitate removal of the preform from the mold, in which it is injection molded, and the associated core pin. The filets 36 extend from the transition of the base portion with the sidewall portion to the closed end of the preform which consists of a substantially flat end lying transversely of the axis 42 and joined to the base structure is by a rapid transition 44 which may be curved or angled depending on the particular preform design and blow mold configuration. The wall thickness of the sidewall portion 24 and the wall portion 34 of the base portion are substantially the same with the filets 36 forming a variable thickness reinforcement ring 38 circumscribing the interior of the base structure of the preform. Toward the closed end 32 from adjacent the reinforcement ring 38, the interior and exterior wall faces 35, 39 of the wall portion 34 taper inwardly toward the axis 42 at an angle of 4 degrees. The exposed surfaces of the filets 36 comprise triangular flat surfaces or facets 46 extending from the reinforcement ring 38 to the closed end 32 substantially parallel to the axis 42 whereby the filets are of ever decreasing thickness and width from the reinforcement ring 38 to the closed end 32. Similar triangular flat surfaces or facets 48 extend from the reinforcement ring 38 to the transition with the sidewall portion 24 with these angled outwardly from the reinforcement ring 38 at an angle of 4 degrees to the axis 42 thereby to cause each filet to taper downwardly both in thickness and width from the reinforcement ring 38 to the transition with the sidewall portion 24. In the area of the facets 48, both the interior and exterior wall faces 35, 39 of the wall portion 34 are essentially cylindrical.

Portions 50 of the interior wall face 35 of the wall portion 34 are exposed between the facets 46 and 48. The facets 46 and 48 are flat and the filets 36 a widest at the reinforcement ring 38 there to form straight edges or ridges. The material provided by the filets 36 provide a geodesic structure reinforcing the ring 38 due to the triangulation of forces operating both circumferentially and longitudinally within the filets around the reinforcement ring. The tapering down of the filets in both directions away from the reinforcement ring longitudinally of the preform serves to provide the necessary additional strength either side of the reinforcement ring for preventing the champagne base of the bottle from inverting under the influence of pressure of a beverage contained therein.

It will be appreciated that due to a curvature of the interior wall face 35 the filets will taper down progressively, continuously and gradually circumferentially from the radially thickest region to the circumferential location of their closest approach to one another along the reinforcement ring.

In the figures illustrating the bottle, the portions of the bottle derived from and corresponding to various portions of the preform are identified by reference numbers which are exactly 100 higher than the reference numerals for the corresponding portions in the figures illustrating the preform. This distinction will be utilized throughout the description of the other embodiments. Additionally, reference numerals used in the other embodiments will be the same as those used with reference to the first embodiment where the features concerned are similar.

Reference numerals identifying features on the various embodiments of core pin will be exactly 200 higher than the reference numerals used with respect to the corresponding features of the associated preform.

The present invention also includes a free standing, one piece plastic container, preferably of PET (polyethylene terephthalate), for carbonated beverages having a champagne type shaped base of controlled thickness to provide an annular chime to provide stable, upright standing ability wherein the thickness of the bottom is controlled to provide adequate resistance to internal pressure, that thickness being derived from a varying thickness of the preform by the incorporation of an integral geodesic structure.

Figure 9:
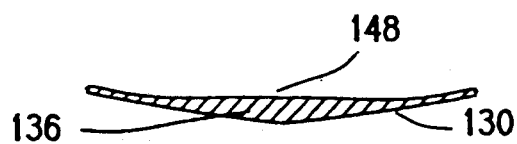
FIG. 9 is fragmentary cross-section on section line 9—9 of FIG. 7.
Figure 10:
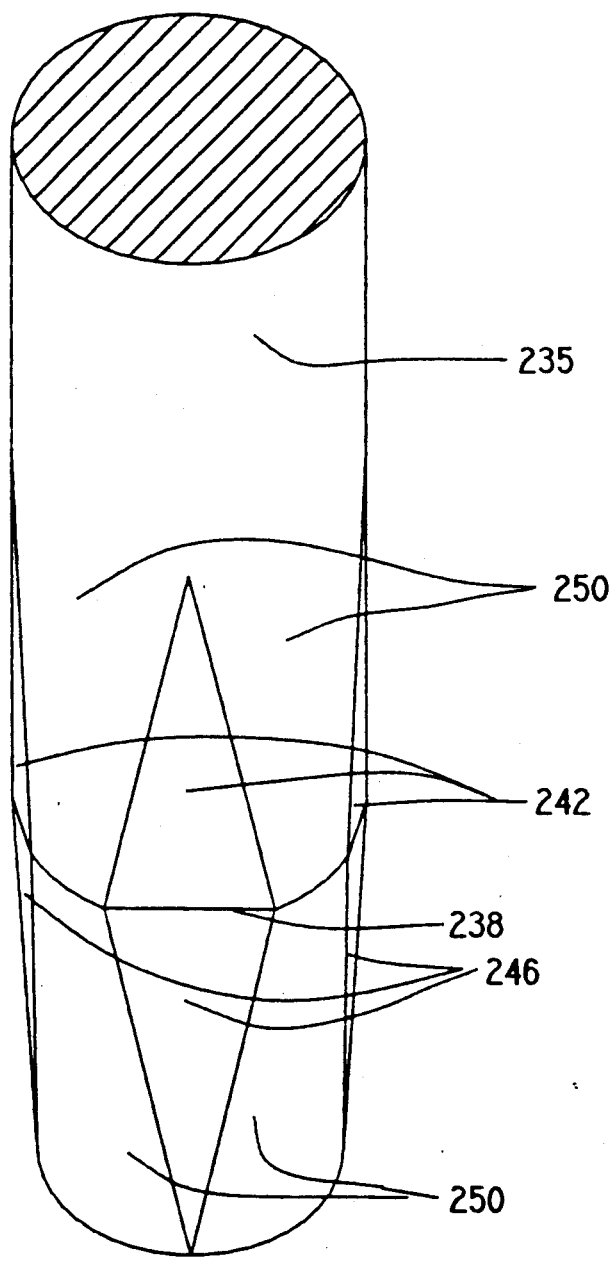
FIG. 10 is isometric view of the end portion of a core pin used in the injection molding of the preform of the first embodiment.

A container, in the form of a bottle, according to the present invention when made from a preform as described above and illustrated in FIGS. 1–5 will now be described with reference to FIG. 6–9. This bottle 114 has been blow molded from the above described preform in a mold partially illustrated in FIG. 1. The bottle includes an annular chime 152 surrounding champagne type central closure 132 and defining an annular surface upon which the bottle can stand. The chime 152 is reinforced, to prevent inversion of the base, when the bottle is filled with carbonated beverages, by the four fillets 36 which in the blow molding process form the fillets 136 of the bottle. The widest and thickest portions of the fillets 36 lie substantially on the chime to provide a reinforcement resisting inversion of the chime and the internal pressure. The facets 46 form bottle facets 146 extending from the reinforcement almost to the center of the base 132 while the facets 48 form bottle facets 148 extending substantially to the transition between the base 130 and the wall portion 126. Accordingly, the fillets 136 decrease in width and thickness continuously from the chime to their maximum radial extend in the base of the bottle. FIG. 9 illustrates a fragmentary cross-section of a fillet 136 in the region of facet 148 illustrating the progressive reduction in thickness circumferentially of the fillet in a direction substantially circumferentially parallel to the chime 152.

For illustrative purposes a container according to the present invention has been described above as being blow molded from a preform. However, it will be appreciated that in so far as containers are concerned, the present invention is not restricted to containers blow molded from preforms and containers made by other means, for example, injection molding, incorporating the geodesic reinforcement herein described, fall within the scope of the present invention.

Figure 11:
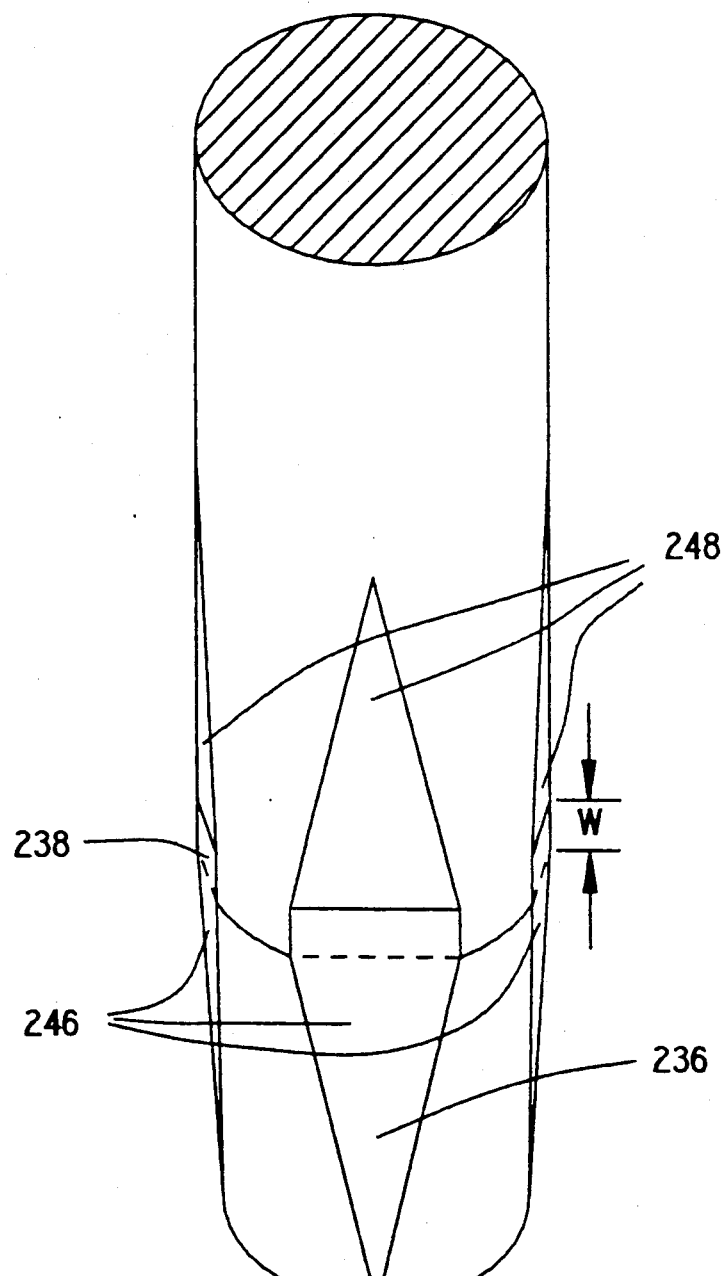
FIG. 11 is an isometric view of a preform in accordance with a second embodiment of the present invention.
Figure 12:
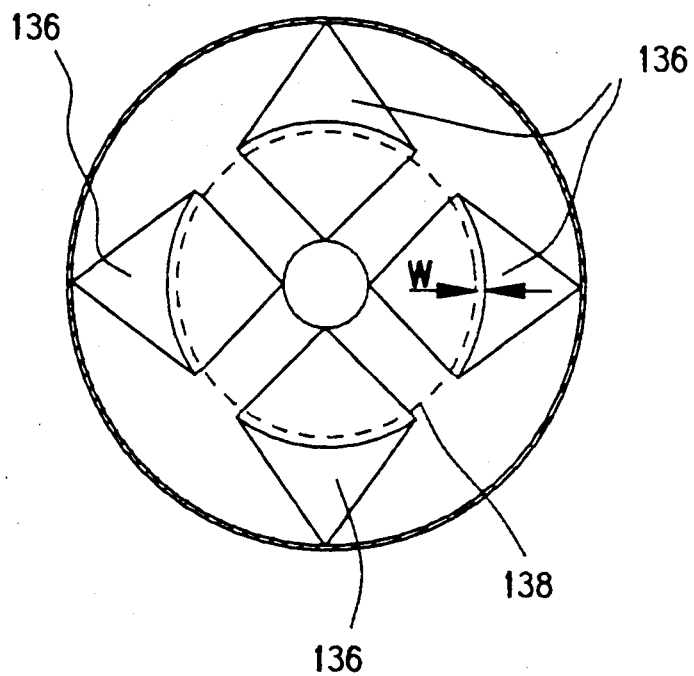
FIG. 12 is a sectional plan view of a bottle made from a preform in accordance with the second embodiment on a section line similar to section line 7—7 of FIG. 6 relative to the first embodiment.

With reference now to the second embodiment illustrated in FIGS. 11 and 12, the intermittent geodesic reinforcement ring 238 here has a discrete width W resulting from an axial displacement of widest part of fillets 236 and the commencement of the taper (preferably at 4° to the axis of the preform) which will form the interior taper of the wall portion toward the closed end of the preform (see FIG. 5), whereby the circumferential width of the surfaces 246 is somewhat truncated. The triangular surfaces 248 in this second embodiment are essentially identical to those of the first embodiment. By virtue of this the reinforcement ring will have a discrete width which will render less critical than placement of that reinforcement ring relative to the chime for satisfactory performance of a bottle (FIG. 12) when made from a preformed formed on the core rod of FIG. 11.

Figure 13:
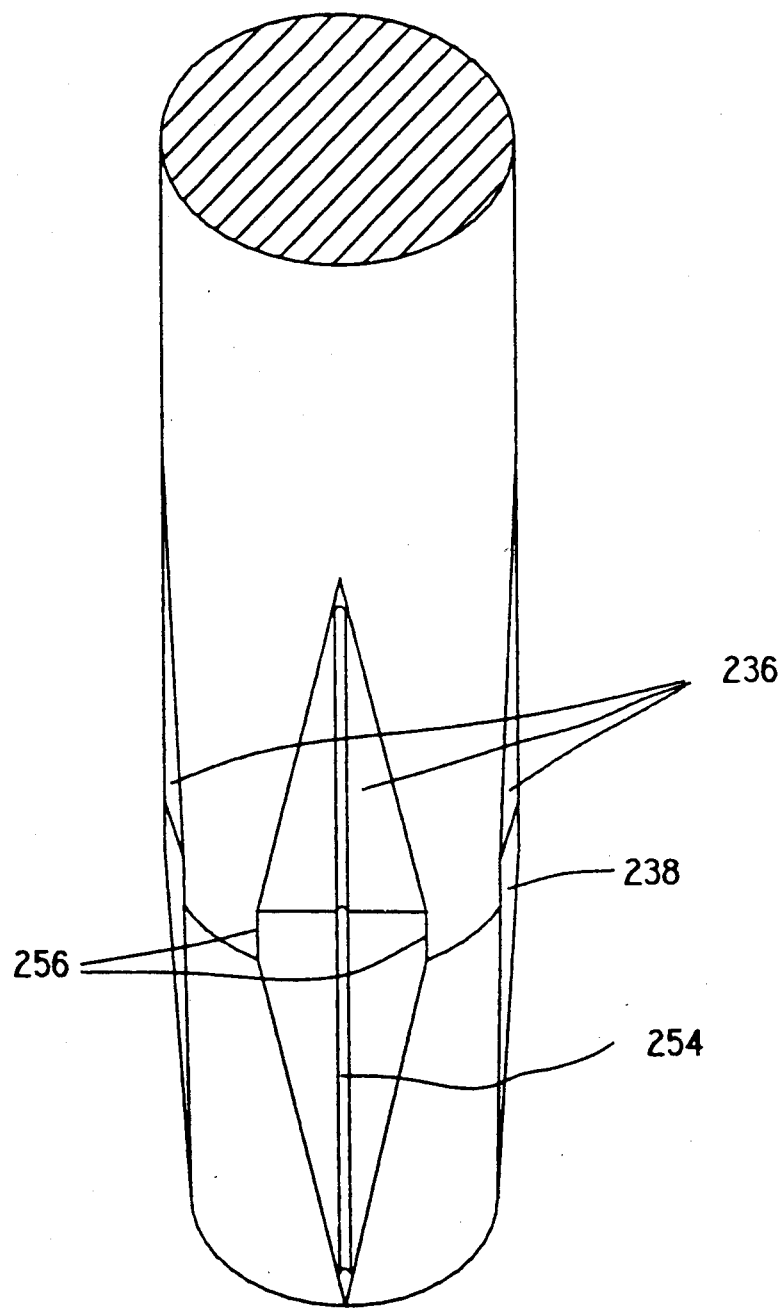
FIG. 13 is an isometric view of the base portion of a core pin used in the injection molding of a third embodiment of the preform according to the present invention.

The third embodiment as illustrated in FIG. 13 is quite similar to that of the second embodiment. However, in this third embodiment the filets 236 have superimposed on them ribs formed by grooves 254 extending longitudinally of the preform for the full longitudinal extent of the filets. The purpose of these ribs is to provide additional control of the longitudinal stretching of the preform in preparation for the introduction of gas under pressure for the blow molding operation and provides additional strength. By the use of these ribs, the desired relatively large longitudinal stretching of the sidewall portion 24 can take place while the desired restriction of the longitudinal stretching of the base structure 28 is facilitated.

Figure 14:
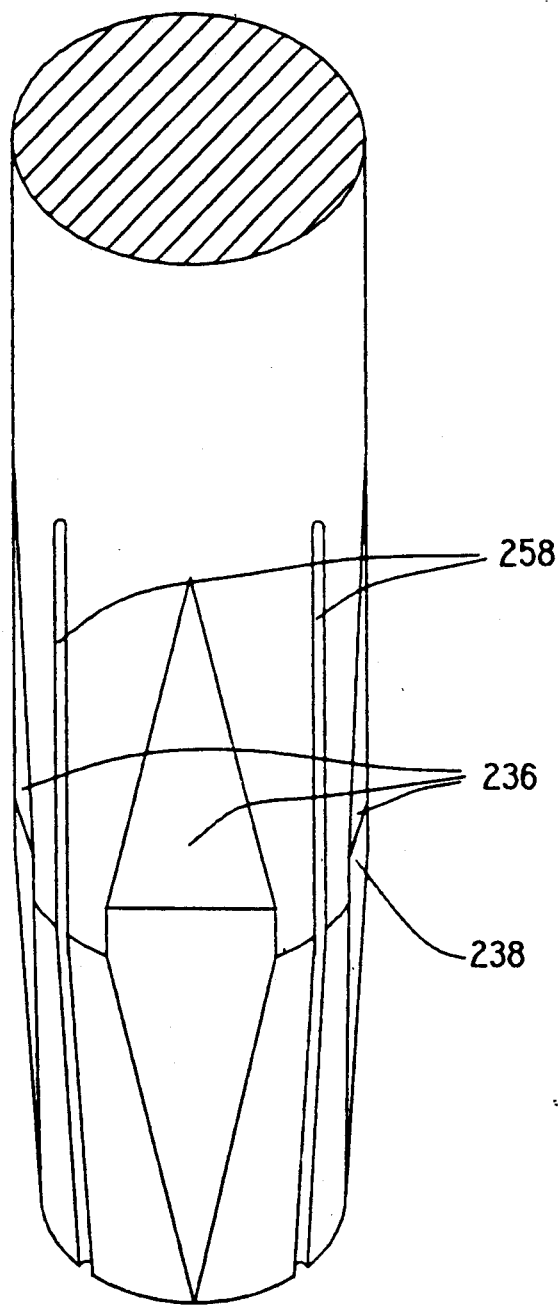
FIG. 14 is an isometric view of the base portion of a core pin for use in the injection molding of a preform in accordance with a fourth embodiment of the present invention.

A variation of the third embodiment is found in the fourth embodiment illustrated in FIG. 14 in which ribs are formed in the interior surface of the wall portion 34 between filets 36. These ribs are formed by grooves 258 in the preform which extend longitudinally for the full extent of the filets 36 serve the same purpose as do the ribs of 54. It will be appreciated by those skilled in the art that the arrangement of the third and fourth embodiments could be combined to double or otherwise modify the number of longitudinally extending ribs for greater control of the stretching of the base portion 28 relative to the sidewall portion 24.

Figure 15:
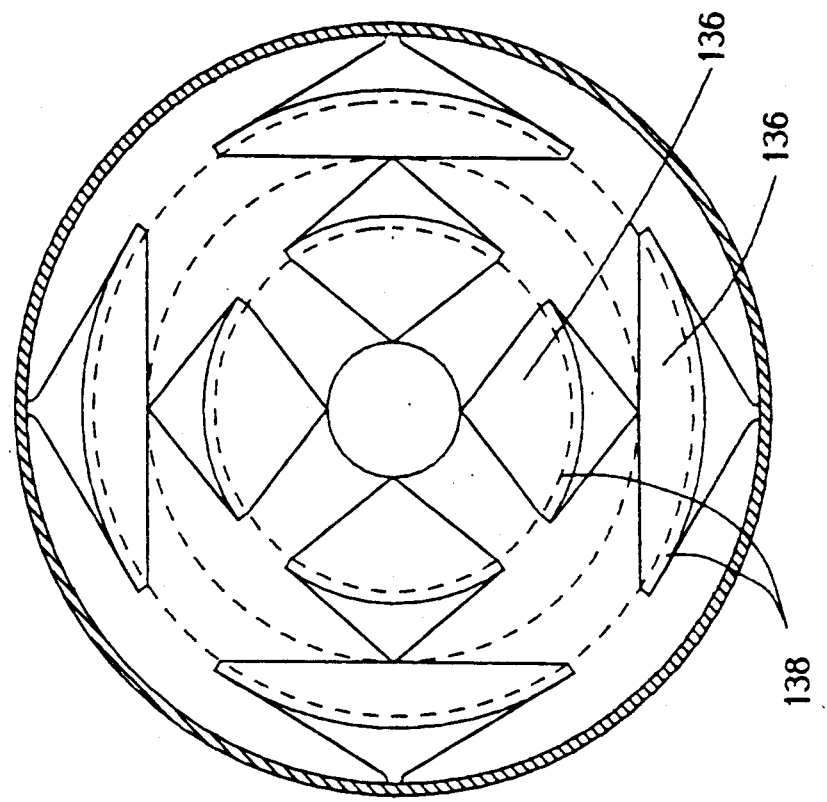
FIG. 15 is a sectional plan view of a bottle made from a preform in accordance with a fifth embodiment of the present invention taken on a section line similar to section line 7—7 of FIG. 6 relative to the first embodiment.
Figure 16:
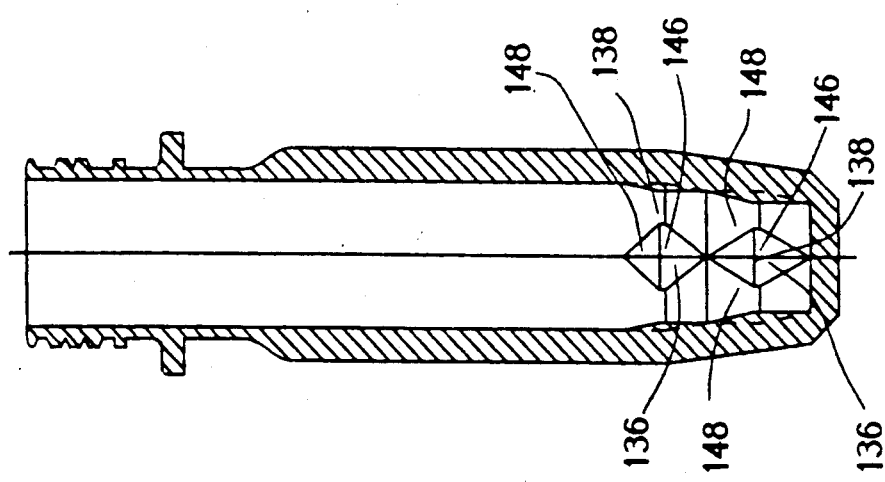
FIG. 16 is a cross-sectional elevation of the entire preform of the fifth embodiment of the present invention.

The fifth embodiment illustrated in FIGS. 15 and 16 involves a preform in which two tiers of filets 36 are disposed longitudinally of one another relative to the longitudinal axis 42 of the preform. By this design two spaced concentric reinforcement rings 138 are formed in a bottle blown from the preform thereby allowing greater flexibility of bottle design and potentially greater material savings.

Other arrangements may use different numbers of filets, e.g. 3, 6, 8, 12, and it will be appreciated by those skilled in the art that within the limits imposed by machining of core pin and the need to provide sufficient extra material to produce an effective triangulation in the geodesic reinforcement ring, the number of filets may be varied as desired. However, it is believed that a preferred range of numbers of filets is from 3 to 12 filets symmetrically arranged about the axis 42 of the preform and that for half-litre bottles, the preferred number of filets is six.

Figure 17:
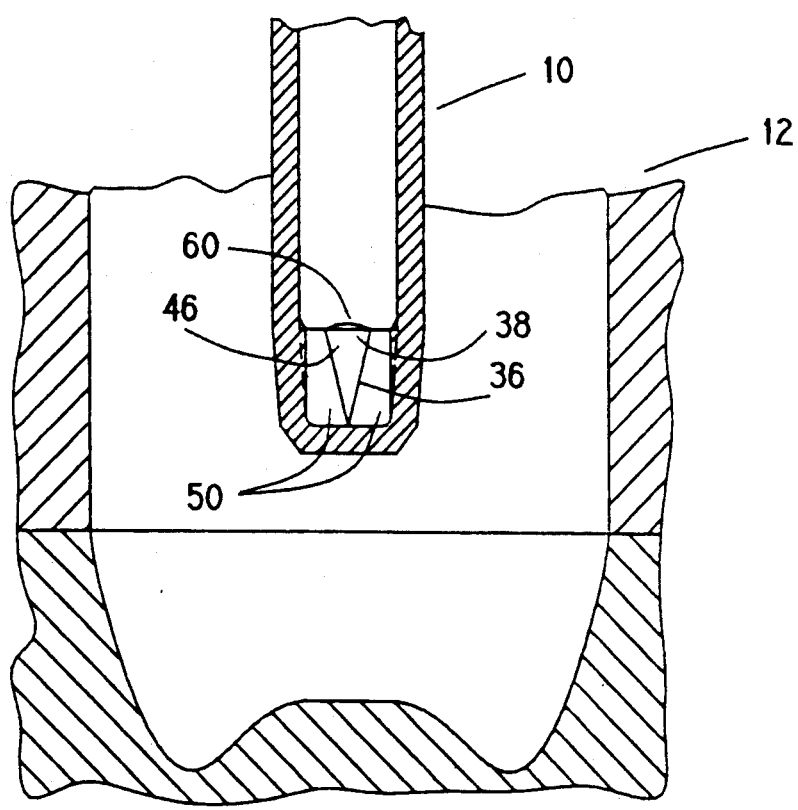
FIG. 17 is a cross-section of the base portion of a preform in accordance with a sixth embodiment of the present invention shown in the base portion of a blow mold.

The sixth embodiment of the invention is illustrated in FIG. 17. In this embodiment, the triangular surfaces 48 are eliminated in favor of a curved surface 60 by way of which the triangular surfaces 46 are joined to the interior wall face 35 of the preform in an area of the base portion extending toward the transition with the sidewall portion 24. The curved surface 60 comprises six surfaces, one for each filet 36 which are exposed toward the neck portion 16 and which are suitable, if desired, to be contacted by a stretch rod to selectively stretch the sidewall portion in preparation for the blowing operation whereby the stretch rod will, upon its extension into the blow mold, stretch the sidewall as desired without significant stretching of the base portion 28.

Figure 19:
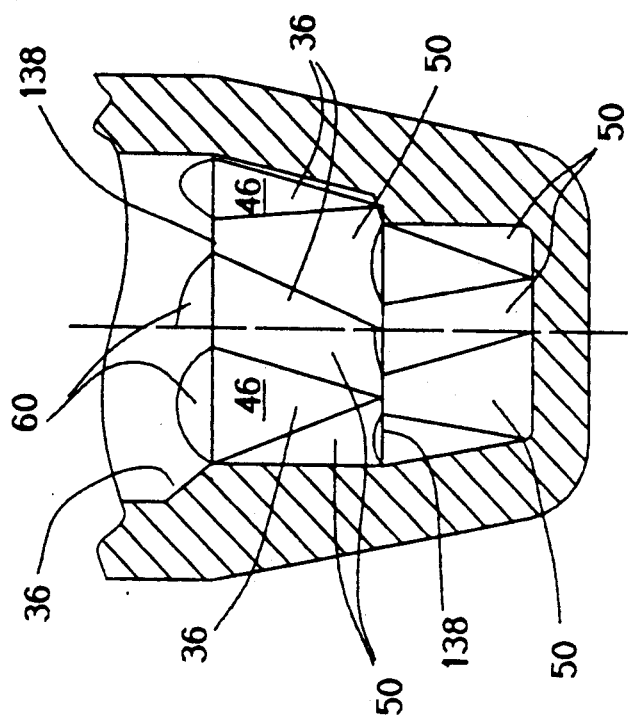
FIG. 19 is a fragmentary sectional elevation on section line 19—19 of FIG. 18.
Figure 18:
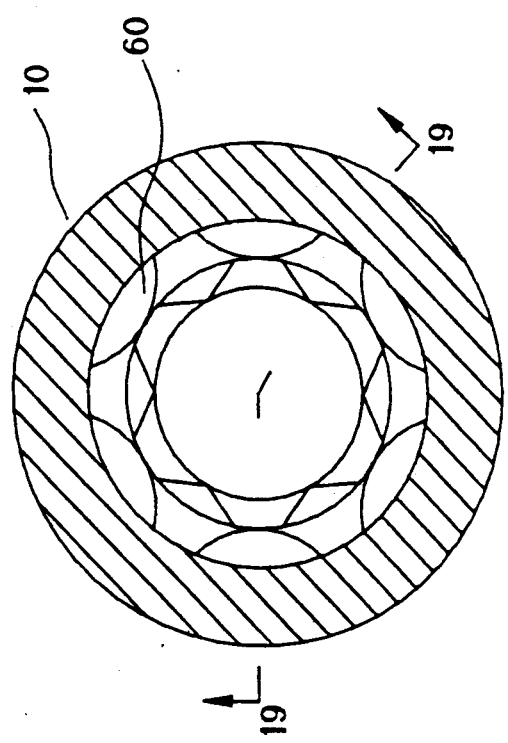
FIG. 18 is a sectional plan view of a preform of a seventh embodiment of the present invention.
Figure 21:
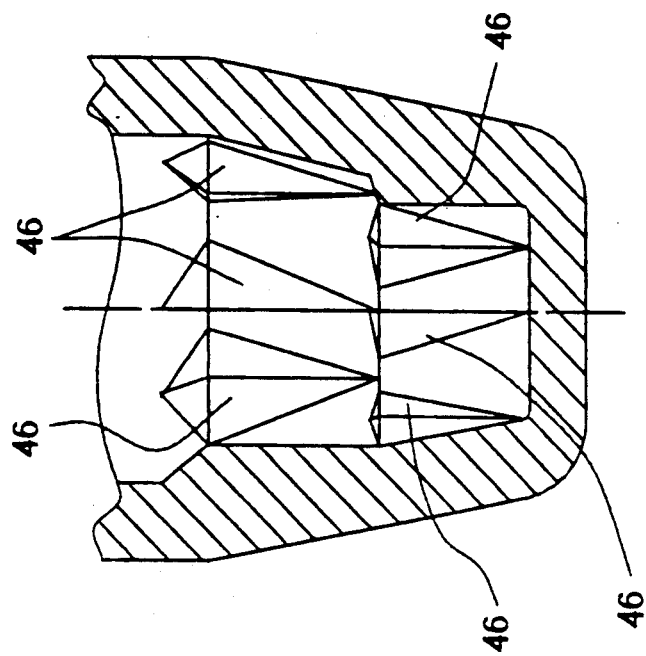
FIG. 21 is a fragmentary sectional elevation on section line 21—21 of FIG. 20.
Figure 20:
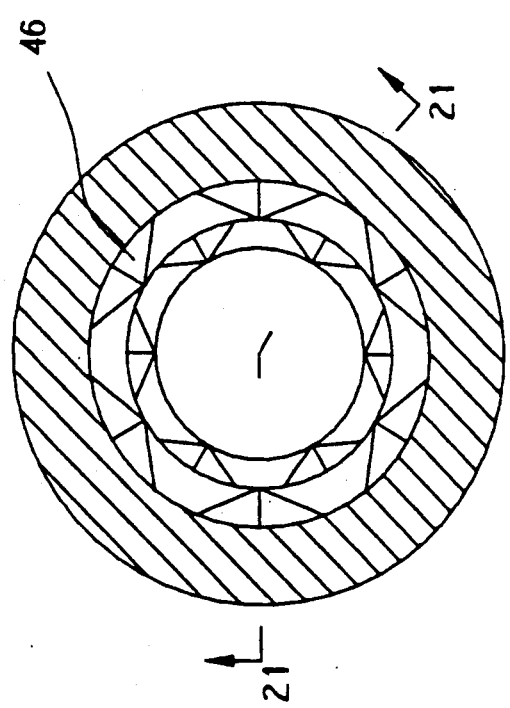
FIG. 20 is a sectional plan view of a preform of an eighth embodiment of the present invention.

The seventh embodiment of the invention is illustrated in FIGS. 18 and 19. In this embodiment, the triangular surfaces 48 are eliminated in favor of a curved surface 60 by way of which the triangular surfaces 46 are joined to the interior wall face 35 of the preform in an area of the base portion extending toward the transition with the sidewall portion 24. The curved surface 60 comprises six surfaces, one for each fillet 36, which are exposed toward the neck portion 16 and which are suitable, if desired, to be contacted by a stretch rod to selectively stretch the sidewall portion in preparation for the blowing operation whereby the stretch rod will, upon its extension into the blow mold, stretch the sidewall as desired without significant stretching of the base portion 28. In this embodiment, two tiers of fillets 36 are disposed longitudinally of one another relative to the longitudinal axis 42 of the preform. By this design, two spaced concentric intermittent reinforcement rings 138 are formed in a bottle blown from the preform thereby allowing greater flexibility of bottle design and potentially greater material savings. In this embodiment, the fillets of the two tiers are circumferentially offset from one another by half of the angles subtended by each fillet 36 so that the triangular point of each fillet of the tier closest to the neck of the preform meets the reinforcement ring 38 between the two tiers at junctions between the fillets of the tier of fillets adjacent the closed end of the preform. Additionally, this embodiment illustrates the option of providing additional reinforcement by forming the faces 46 as convex faces to increase the depth of material of the fillets at the reinforcement rings they create at the center of the angles subtended for each fillet.

The eighth embodiment of the invention is illustrated in FIGS. 20 through 23. This embodiment is quite similar to that described with reference to the seventh embodiment differing substantially only in that the facets 46 are folded to increase the depth of material at the center of each fillet with a consequence that a central longitudinally extending fold line is centrally located in each facet 46. As a result of this, the curved surface 60 also may be formed with a central fold.

It will appreciated that with embodiments utilizing two or more tiers of fillets 36 to form a multiplicity of reinforcement rings, the fillets from one tier can be arranged to overlap the fillets of the other tiers particularly in an arrangement in which the fillets of adjacent tiers are circumferentially offset from one another. By the means, additional reinforcement of a reinforcement ring may be achieved where desired.

The present invention is also directed to a process for manufacturing a free-standing plastic container, preferably of PET (polyethylene tarephthalate), for carbonated beverages having a champagne type shaped base of controlled thickness to provide an annular chime to provide stable upright standing ability wherein the thickness of the bottom is controlled to provide adequate resistance to internal pressure, that thickness being derived from a varying thickness in the preform from which the container is manufactured in the form of an integral geodesic structure that runs horizontally of the bottle in the hoop direction.

Figure 22:
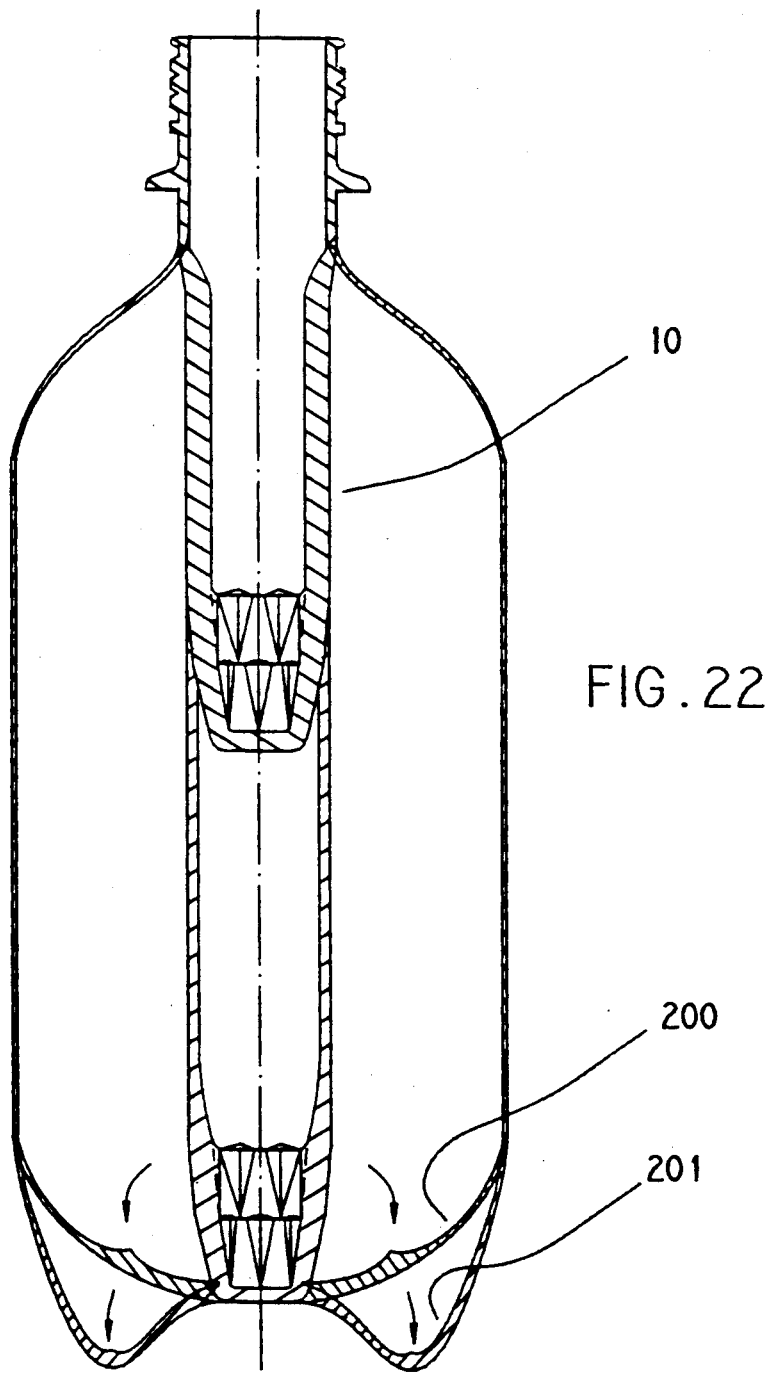
FIG. 22 is a composite diagrammatic sectional elevation showing the transformation of a preform of the eighth embodiment into a bottle by first stretching the preform and then blowing that preform to form a bottle.

That process will now be described with reference to FIG. 22, in which the sequence of operations in the blow molding container, in form of a bottle is illustrated with respect to the eight embodiment. Of course, a similar process would apply equally to the other embodiments of preform encompass of the present invention.

Figure 23:
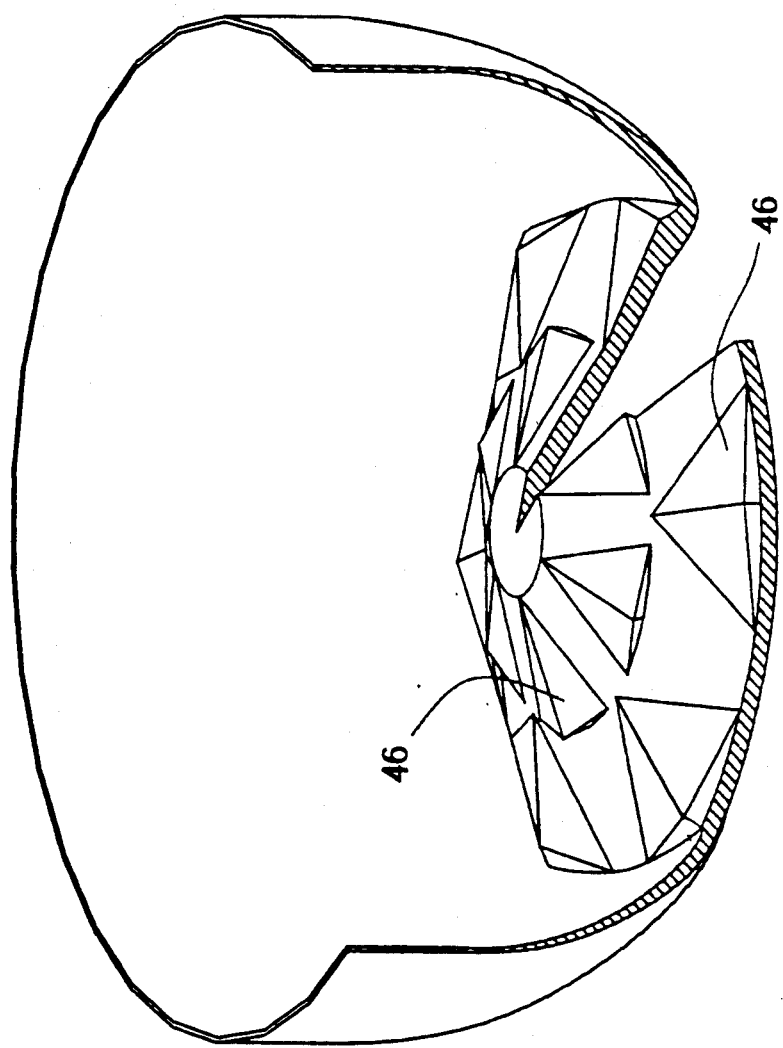
FIG. 23 is a fragmentary partially sectioned perspective view of interior of the base of the bottle when made from a preform of the eighth embodiment.

Following the manufacture of a suitable preform 10 by injection molding and a temperature conditioning of that preform preparatory to blow molding, the preform 10 is placed in a blow mold 12 and is then stretched by a stretch rod (not shown in FIG. 22) until its base is closely adjacently in the innermost end of the blow mold. This stretching is carried out in a manner to stretch the sidewall of the preform without significantly stretching or deforming the base portion thereof. Once this stretching is completed, the preform is blown to unfold the base and stretch the sidewall with the base first assuming a position and shape as shown at 200 and subsequently completely being formed as shown at 201 to form a champagne base with a geodesic reinforcement reinforcing a chime and inwardly extending area capable of resisting the unrolling stresses applied by carbonated beverages which might be contained in the bottle. The dashed lines with arrows indicate the general movement of the material from the geodesic reinforcement area to the chime area of the finished bottle. FIG. 23 illustrates the shape of the interior base of the finished bottle when blown as illustrated in FIG. 22.

As mentioned further embodiments may have curved or folded facets 46 much like those of the seventh or eighth embodiment and in these embodiments, the two tiers of fillets may overlap one another longitudinally to bring the reinforcement rings closer together and, in some of the embodiments, additional intermediate fillets may be added to provide a third (or further) reinforcement ring.

Ignoring the ever decreasing diameter of the interior and exterior walls of the preform (which is dimensionally minor), the preform of the first embodiment for the manufacture of a half-litre bottle will have an interior diameter in the sidewall portion of 13.7 millimeters and an interior diameter at the closed end of 12.2 millimeters. The longitudinal extension of the fillets 36 is approximately 25.4 millimeters. Additionally, the closed end 32 may be thinner by approximately 20 percent than the thickness of the sidewall portion 24 and the remainder of the base portion 28.

It will be appreciated that the closed end 32 need not necessarily be a substantially flat disc-like closure and that other shapes may be utilized without departing from the concept of the present invention.

Similarly, other shoulder portion designs and neck portions might be utilized as these do not play a direct part in the inventive advance provided by the present invention which advance revolves around the manner of providing a reinforcement based on the circumferential and longitudinal triangulation of forces of a geodesic structure in the base portion of the preform to form a reinforcement in the base of a champagne type self-standing, one-piece container for carbonated beverage following blowing in a blow mold. Reference to FIG. 1 will illustrate with the directional lines 62 the distribution of material from the preform to the blown bottle. This distribution results from the shape of the preform, the shape of the blow mold, the extent of the stretching of the preform in preparation for blow molding and the temperature conditioning and temperature distribution in the preform during blow molding. These are matters well-known to those skilled in the art and will not be described in detail here.

It will be readily apparent to a man skilled in the art that the filets could be replaced with similar reinforcing structures forming a geodesic reinforcement ring on the exterior of the preform and that such an arrangement is considered to be within the scope of the present invention. However, this is not believed to be the best mode of performing the present invention as there are many technical problems in putting such an arrangement into practical effect. These involving the problems of forming the injection mold cavity for the preform including the desirable use of a single cavity injection mold to avoid the need for the expensive and complex two-part molds, the need for corresponding shapes in the blow mold and the problems of orienting an exteriorly reinforced preform to match the shaped blow mold. Consequently, it is believed that the most practical form of the present invention involves the provision of filets 36 as described in the interior of the preform.

It will also be appreciated that while the preferred description has been made with reference to half-litre bottles, the invention is applicable to other sizes, for example, one-litre and two-litre sizes.

The present invention is also directed to a moldcore rod combination for forming a preform according to the present invention.

Figure 24:
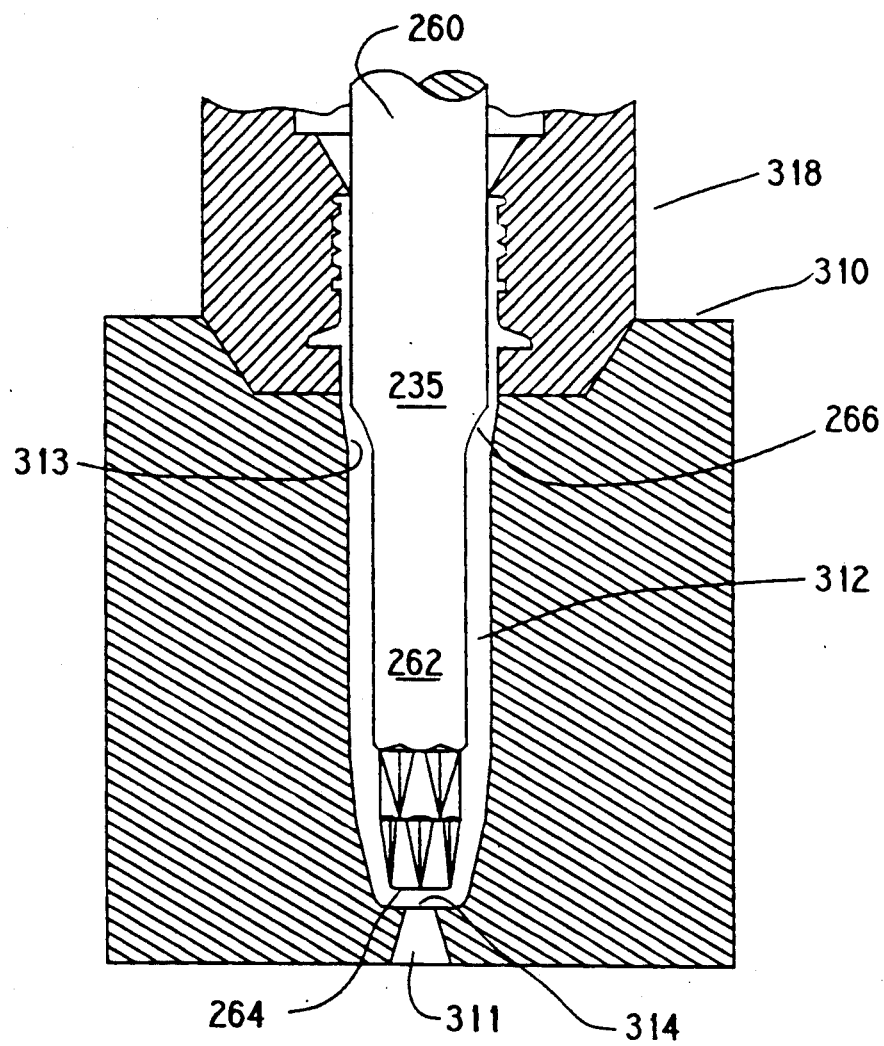
FIG. 24 illustrates a mold-core rod combination according to the present invention for injection molding a preform according to the eighth embodiment.

Referring now to FIG. 24, there is illustrated a partable injection mold 310 having a preform (parison) cavity 312 for molding a preform 10 in a conventional manner through gate opening 314. The illustrated mold 310 is designed for molding a tubular preform, generally identical to the eleventh embodiment, for a container which includes a threaded neck finish 16 wherein the core rod 235 remains in place. For convenience of handling the preform, the mold 310 is provided with a split neck ring 318 to provide the threaded neck finish. Cooperating with mold 310 and split neck ring 318 for the formation of the parison is a core rod generally identified by the numeral 235 The core rod includes a base portion 260 and a core rod proper 262 having a flat end 264 which in cooperation with flat mold section 311 forms the bottom 32 of the preform 10. Additionally, the core rod includes a shoulder 266 which in cooperation with curved mold section 313 forms the shoulder portion 20 of the preform.

The geodesic faceted interior shape adjacent the base of the preform 10 is defined by the exterior surface shape of the core rod 235 adjacent its end 264.

It will be appreciated that by varying the surface shape of the mold-core rod combination, any of the embodiments of preform 10 herein described together with many variations thereof could be produced without further invention being required.

As mentioned above, the present invention also relates to a process and certain basic aspects of that process were described with reference to the eighth embodiment. More particularly, however, the process for manufacturing a molecularly oriented plastic bottle according to the present invention comprises the steps of (1) providing an injection molded plastic preform having a neck portion defining an opening; a tubular sidewall portion depending therefrom; and an integral base structure depending from the tubular sidewall portion to a closed end; the preform having an outside wall face and an inside wall face, with at least one of the inside wall face and the outside wall face of the base structure having integrally formed thereon a plurality of filets, extending longitudinally of the preform to define an intermittent reinforcing ring of varying thickness spaced from the closed end and circumscribing the base structure, wherein the filets decrease progressively in width and radial thickness at least from said reinforcing ring toward said closed end, the preform being capable of forming a blow molded plastic bottle with a bottom portion having a reinforcing ring of circumferential alterations in wall thickness with a regularly undulating cross-section along the circumference; (2) positioning the preform in a stretch/blow mold; and (3) stretch/blowing the preform in the blow mold to form a finished bottle. In this process the filets are preferably integral with the inside wall face, decrease progressively in width and radial thickness from the reinforcing ring toward the sidewall portion and each define two substantially triangular facets joined together to form a straight ridge at the ring, the facets substantially facing inward toward one another and being oriented to facilitate removal of the preform from a core rod during injection molding of the preform.

In a preferred form of the process, both the inside and outside walls of the preform taper in similar manner and the closed end thereof is substantially flat and terminates in a rapid transition to the base structure.

We claim:

1. A plastic preform for forming blow molded plastic bottles which comprises: a neck portion defining an opening; a tubular sidewall portion depending therefrom; and an integral base structure depending from the tubular sidewall portion to a closed end; said preform having an outside wall face and an inside wall face, with at least one of the inside wall face and the outside wall face of the base structure having integrally formed thereon a plurality of filets, extending longitudinally of the preform to define a reinforcement of varying thickness spaced from the closed end and circumscribing the base structure, wherein said filets decrease progressively in width and radial thickness at least from said reinforcing ring toward said closed end, the preform being capable of forming a blow molded plastic container with a bottom portion having a reinforcement of circumferential alterations in wall thickness with a regularly undulating cross-section along said circumference.

2. A plastic preform according to claim 1 wherein said plurality of filets are spaced from one another to define said reinforcement capable of forming a reinforcement of continuous said alterations in said container.

3. A preform according to claim 2 wherein said filets are integral with said inside wall face.

4. A preform according to claim 1 wherein said filets decrease progressively in width and radial thickness from said reinforcing ring toward said sidewall portion.

5. A preform according to claim 4 wherein said filets each define two substantially triangular facets joined together to form a substantially straight ridge at said ring, said facets substantially facing inward toward one another and being oriented to facilitate removal of said preform from a core rod during injection molding of the preform.

6. A preform according to claim 2 wherein said inside wall face tapers inwardly from approximately said reinforcing ring toward said closed end with adjacent portions of said filets integrally formed thereon.

7. A preform according to claim 1 in which filets define facets having a fold dividing each facet and extending longitudinally of said preform.

8. A preform according to claim 1 wherein there are from 3 to 12 said filets symmetrically disposed about said axis to define said reinforcing ring normal to said axis.

9. A preform according to claim 5 wherein said filets are closest together at a point between said ridges.

10. A preform according to claim 5 wherein said filets are closest together at a line between said ridges thereby producing a reinforcing ring having a finite width longitudinally of said axis.

11. A preform according to claim 1 wherein a symmetrical plurality of longitudinally extending ribs are formed in the interior of the base structure sized and located to provide a desired control of stretching of the base structure relative to said sidewall portion during stretching of the preform in a blow mold, following temperature conditioning of the preform, in preparation for blow molding.

12. A preform according to claim 1 wherein said base structure has at least two pluralities of said filets disposed longitudinally of one another to form a like number of longitudinally spaced reinforcements circumscribing the inside wall face of the base structure.

13. A container when blow molded from a preform according to claim 1.

* * * * *